United States Patent

Goto et al.

[11] Patent Number: 5,304,416
[45] Date of Patent: Apr. 19, 1994

[54] MAGNETIC RECORDING MEDIUM

[75] Inventors: Narito Goto; Katsuyuki Takeda; Kunitsuna Sasaki; Nobuyuki Sekiguchi, all of Hino, Japan

[73] Assignee: Konica Corporation, Japan

[21] Appl. No.: 995,925

[22] Filed: Dec. 21, 1992

Related U.S. Application Data

[63] Continuation of Ser. No. 717,918, Jun. 20, 1991, abandoned.

[30] Foreign Application Priority Data

Jun. 29, 1990 [JP] Japan ................................ 2-172994

[51] Int. Cl.$^5$ ............................ B32B 5/16; G11B 5/66
[52] U.S. Cl. .................................. 428/329; 428/336; 428/694 B; 428/694 BU; 428/694 BM
[58] Field of Search ............... 428/323, 329, 694, 900, 428/336, 694 B, 694 BU, 694 BM

[56] References Cited

U.S. PATENT DOCUMENTS

| | | | |
|---|---|---|---|
| 4,569,856 | 2/1986 | Miyoshi et al. | 428/900 |
| 4,690,863 | 9/1987 | Miyoshi et al. | 428/900 |
| 4,784,895 | 11/1988 | Mizuno et al. | 428/900 |
| 4,859,500 | 8/1989 | Kakuta et al. | 428/694 |
| 4,992,330 | 2/1991 | Kawahara et al. | 428/336 |

Primary Examiner—Paul J. Thibodeau
Assistant Examiner—Leszek Kiliman
Attorney, Agent, or Firm—Jordan B. Bierman

[57] ABSTRACT

A magnetic recording tape with plural magnetic layers, having both the electromagnetic conversion properties, particularly the chromatic output, and the corrosion resistance is disclosed.

The top layer contains a magnetic metal powder having 0.2-1.5% of water when it is mixed into a magnetic paint and a layer other than the top layer has the coercive force of 500 to 12000 Oe.

10 Claims, 2 Drawing Sheets

MAGNETIC RECORDING MEDIUM

This application is a continuation of application Ser. No. 07/717918, filed Jun. 20, 1991, now abandoned.

FIELD OF THE INVENTION

This invention relates to a magnetic recording medium such as a magnetic tape, a magnetic sheet, or a magnetic disk.

BACKGROUND OF THE INVENTION

Generally, a magnetic recording medium such as a magnetic tape is prepared by coating a magnetic paint comprising a magnetic powder and a binder resin over a support.

In the recent tendency of making a recording density higher, electromagnetic conversion characteristics including, particularly, a chroma output have been required to be improved, because those characteristics have relatively been unsatisfactorily displayed. In the conventional magnetic recording media, Japanese Patent Publication Open to Public Inspection-hereinafter referred to as 'Japanese Patent O.P.I. Publication'- No. 61-8726/1986, for example, discloses the technique for making a dispersion state excellent and making a squareness ratio and a S/N ratio higher when a magnetic layer is comprised of a single layer and the adsorbate moisture of of a ferromagnetic alloy powder having a BET value of not less than 45 $m^2/g$ is made to be in a weight percentage of not higher than 1.2 wt. %. Japanese Patent O.P.I. Publication No. 60-187931/1985 proposes a medium containing a ferromagnetic material controlled to have a moisture in a weight percentage of not less than 0.8 wt % so as to be dispersed it uniformly when making use of a magnetic layer comprising a single layer and a ferromagnetic material having a BET value of 35 $m^2/g$. Further, Japanese Patent O.P.I. Publication No. 64-19524/1989 and Japanese Patent Application Nos. 64-77450/1989 and 64-79307/1989 disclose each the techniques in which a plurality of magnetic layers are used and ferromagnetic metal powder is used in the uppermost layer, respectively.

According to the above-given techniques, however, an electromagnetic conversion properties including, particularly, a chroma output, have not been satisfactory and an adsorbate moisture has not also been satisfactorily controlled. Therefore, there have raised the problems that a residual solvent has still remained more in a magnetic layer and a running durability has also been deteriorated.

SUMMARY OF THE INVENTION

It is an object of the invention to provide a magnetic recording medium comprising a plurality of magnetic layer, wherein a residual solvent remains few, a running durability is excellent, a mixedly kneading property is excellent, and the electromagnetic conversion properties including, particularly, a chroma output, are improved.

This invention relates to a magnetic recording medium comprising a non-magnetic support provided thereon with at least two magnetic layers out of which the uppermost layer contains a ferromagnetic metal powder having an adsorbate moisture within the range of 0.2 to 1.5 wt. % -in terms of the weight parts of the adsorbate moisture per 100 weight parts of the magnetic powder, and at least one of the other magnetic layers than the uppermost layer has a magnetic coercive force within the range of 500 to 1200 Oe.

BRIEF DESCRIPTION OF THE DRAWINGS

The drawings attached hereto each exemplarily illustrate the invention.

DETAILED DESCRIPTION OF THE INVENTION

Figure 1:
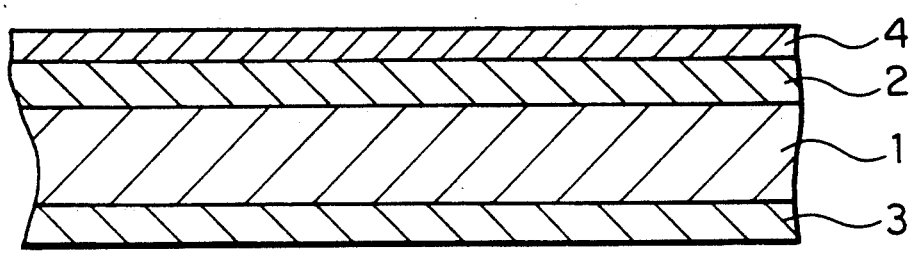
FIGS. 1 and 2 illustrate, respectively, the cross-sectional views of the examples of magnetic recording media.

It is desirable that the magnetic recording media of the invention are to be comprised of a plurality of magnetic layers—namely, the uppermost layer and at least one lower layer—and that a plurality of the magnetic layers are to be adjacent to each other. It is also allowed that the above-mentioned lower layer may comprise either a single layer or not less than two layers.

Each of the layers can be formed so that the high-pass recording and regenerating properties such as an RF output and a lumi S/N may be made excellent in the upper layer out of the layers, and the relatively lower pass recording and regenerating properties such as a chroma output and a chroma S/N may be made excellent in the lower layer thereof.

For materializing the above-mentioned layer formation, it is generally desired to make greater the magnetic coercive force —Hc— of each of the upper layers—including, particularly, that of the uppermost layer—than those of the lower layers and to make thinner the coated thickness—or, the layer thickness—of each of the upper layers. It is also desired to make the thicknesses of each of the layers to be not thicker than 1.5 $\mu$m. It is further desired the coated thickness of each of the lower layers adjacent to the above-mentioned upper layers is to be within the range of 1.5 to 4.0 $\mu$m.

There is the case where a definite interface is substantially present between each of the layers. However, there is also the case where an interface region is present, in which both of the layers are intermingled together with a certain thickness and, in this case, the upper or lower layers are served as each of the above-mentioned layers after removing the above-mentioned mingled interface. In particular, the media of the invention are particularly suitable for coating each of the magnetic layers in a wet-on-wet simultaneous multi-layer coating process. It is the matter of course that a wet-on-dry process for coating the upper layer after drying the lower layer can also be used.

According to the magnetic recording media of the invention, it is particularly essential that the uppermost layer of a magnetic layer is to contain ferromagnetic metal powder having an adsorbate moisture in a weight percentage within the range of 0.2 to 1.5 wt. %. In other words, when an adsorbate moisture is not lower than 0.2 wt. %, each surface of the magnetic powder shows hydrophilicity to an inherently oleophilic solvent to deteriorate the affinity of both of the magnetic powder and the solvent so that the solvent adsorption is reduced by the magnetic powder. Therefore, the residual solvent is reduced. From the above-mentioned facts, the durability of the uppermost magnetic layer can be improved,—in other words, the magnetic powder can excellently be bonded by making use of binders—.

On the other hand, the adsorbate moisture of the above-mentioned ferromagnetic metal powder is restricted to be not higher than 1.5 wt. % so that the magnetic powder can keep the property to satisfactorily bond to the binder. Therefore, an excellent kneading property can be displayed and the magnetic powder can excellently be dispersed, so that an electromagnetic conversion property can also be improved. In addition to the above, any extra moisture is not adsorbed. Therefore, no reaction is produced with such a hardener as isocyanate, so that the pot-life of a coating solution can be excellent.

From the fact that the adsorbate moisture of the ferromagnetic metal powder contained in the uppermost layer is limited to be within the specific range of 0.2 to 1.5 wt. % as described above, the durability of the uppermost layer can be improved even when it is rubbed directly with a magnetic head or the like in severe conditions and, at the same time, the required performance—including the high-pass properties such as an RF output—can also be improved. As the results thereof, the above-mentioned uppermost layer can satisfactorily be used as the uppermost layer of a plurality of magnetic layers and, in addition, the electromagnetic conversion property can also be displayed excellently. The above-mentioned advantages are remarkably meaningful for improving the performance, when taking the advantages into consideration of the requirements for displaying the above-mentioned performance—such as the requirements that the coated thickness of the uppermost layer is to be thinned and the magnetic powder used therein is to be finely pulverized ferromagnetic metal powder—.

The adsorbate moisture contents of the above-described ferromagnetic metal powder are within the range of, desirably, 0.8 to 1.2 wt. % and, preferably, 0.9 to 1.1 wt. %.

The above-mentioned adsorbate moisture contents may be measured or selected in the following method. An adsorbate moisture is controlled by treating a ferromagnetic metal powder in an inert gas such as nitrogen gas containing a specific amount of moisture and the adsorbate moisture is measured by making use of a microconstituent moisture measurement instrument, Model CA-06 manufactured by Mitsubishi Chemical Industrial Co., Ltd., at a temperature of 120° C. in Karl Fischer's process.

In the invention, when the magnetic coercive force of at least one of the magnetic layers other than the uppermost layer is kept to be within the range of 500 to 1200 Oe, the electromagnetic conversion properties including, particularly, the chroma output, can be improved.

From the fact that the magnetic coercive force of at least one of the above-mentioned magnetic layers is kept within the range of not higher than 1200 Oe, a low-pass recording and a regenerating property can be improved and, in particular, the chroma output can also be improved. In addition to the above, from the fact that the above-mentioned magnetic coercive force is kept within the range of not lower than 500 Oe, a high-pass recording, a regenerating property and, particularly, an RF output and a lumi S/N ratio cannot be affected in the surface layer portions of the magnetic layers, so that the properties can be excellent.

The magnetic coercive force is desirably within the range of 700 to 1000 Oe and, preferably, within the range of 800 to 1000 Oe.

From the fact that the uppermost layer of the above-mentioned magnetic layers contains ferromagnetic metal powder, the filling property can be improved and a high frequency property can also be displayed. The magnetic coercive force of the above-mentioned ferromagnetic metal powder is desirably within the range of 1500 to 2000 Oe.

As shown in FIG. 1, for example, the magnetic recording media of the invention are each comprised of non-magnetic support 1 such as those made of polyethylene terephthalate laminated thereon with the first magnetic layer 2 and the second magnetic layer 4 in this order. And, on the opposite side of the support to the above-mentioned magnetic layer-laminated surface, there is coated with back-coat layer 3 which is, however, not necessarily provided. On the second magnetic layer, an over-coat layer may also be arranged. In the example shown in FIG. 2, the upper layer was separated into layer 5 and layer 6.

Figure 2:
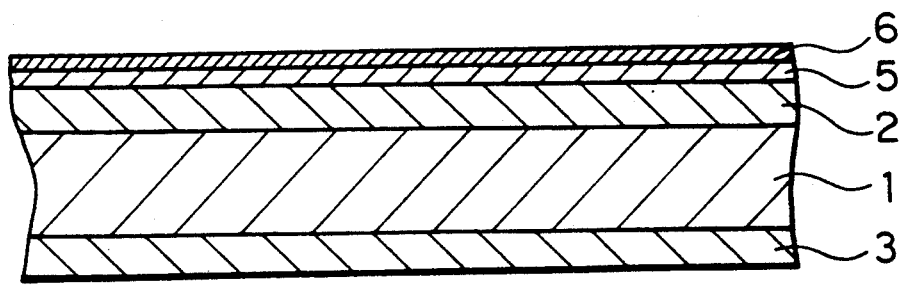

In the magnetic recording media shown in FIGS. 1 and 2, the coated thickness of the first magnetic layer 2 is to be kept within the range of, desirably, 1.5 to 4.0 $\mu$m—such as 2.5 $\mu$m—, and the coated thickness of the second magnetic layer 4 or a total coated thickness of magnetic layers 5 and 6 are desirable to be kept within the range of 0.1 to 1.5 $\mu$m—such Into the second magnetic layer 4 or the third magnetic layer 6, ferromagnetic metal powder having an adsorbate moisture in a weight percentage within the range of 0.2 to 1.5 wt. % is to be contained.

The above-mentioned magnetic powder include, for example, the various kinds of ferromagnetic powder such as magnetic metal powder principally comprising Fe, Ni and Co, e.g., an Fe-Ni-Co alloy, an Fe-Ni alloy, an Fe-Al alloy, an Fe-Al-Ca alloy, an Fe-Al-Ni alloy, an Fe-Al-Co alloy, an Fe-Mn-Zn alloy, an Fe-Ni-Zn alloy, an Fe-Al-No-Co alloy, an Fe-Al-Ni-Cr alloy, an Fe-Al-Co-Cr alloy, an Fe-Co-Ni-Cr alloy, an Fe-Co-Ni-P alloy, and a Co-Ni alloy. For the magnetic layer 4 or 6 of the uppermost layer and the other magnetic layer 2 or 5—or, the other magnetic layers 5 and/or 2—, the former layer 4 or 6 is to be served as the uppermost layer and the latter magnetic layer 2 or 5, or 5 and 2 are to be served as the lower layer.

From among those magnetic powder, a ferromagnetic metal powder is selected suitably for the above-mentioned magnetic layers 4 and 6. For magnetic layers 2 and 5, a suitable metal oxide can be selected from the group consisting of $\gamma$-$Fe_2O_3$, Co-containing $\gamma$-$Fe_2O_3$, $Fe_3O_4$, and Co-containing $Fe_3O_4$.

Into each of the magnetic layers, it is allowed to add a monobasic aliphatic acid havine 12 to 20 carbon atoms -such as stearic acid-, an aliphatic acid ester having a total carbon atom number of 13 to 40, an abrasive—such as fused alumina—, a dispersant—such as powdered lecithin—, and an antielectrostatic agent—such as carbon black—.

As for the binders applicable to magnetic layer 2, 4, 5 or 6, those having an average molecular weight within the range of approximately 10000 to 200000 may be used. They include, for example, a vinyl chloride-vinyl acetate copolymer, a vinyl chloride-vinylidene chloride copolymer, a vinyl chloride-acrylonitrile copolymer, a polyvinyl chloride, a urethane resin, a butadiene-acrylonitrile copolymer, a polyamide resin, polyvinyl butyral, a cellulose derivative—such as cellulose acetate butyrate, cellulose diacetate, cellulose triacetate, cellulose propionate and nitrocellulose—, a styrene-butadiene copolymer, a polyester resin, a variety of synthetic rubbers, a phenol resin, an epoxy resin, a urea resin, a melamine resin, a phenoxy resin, a silicone resin, an acryl type reactive resin, a mixture of a high molecular weight polyester resin and an isocyanate prepolymer, a mixture of polyester polyol and polyisocyanate, a urea formaldehyde resin, a mixture of a low molecular weight glycol / a high molecular weight diol/isocyanate, and the mixtures thereof.

The above-mentioned binders are desirably comprised of the resins each containing hydrophilic polar groups such as—$SO_3M$, —COOM and $PO(OM')_2$—in which M represents hydrogen or an alkali metal such as lithium, potassium and sodium; and M' represents hydrogen, an alkali metal such as lithium, potassium and sodium, or a hydrocarbon residual group—. Such a resin as mentioned above is improved in the affinity to magnetic powder by the presence of the intramolecular polar groups. Therefore, the dispersibility of the magnetic powder can further be improved and the magnetic powder can be prevented from cohesion, so that the stability of a coating solution can further be improved. The above-mentioned advantages also bring a medium in the improvement of the durability.

The above-mentioned binders including particularly the vinyl chloride type copolymers can be prepared by copolymerizing a vinyl chloride monomer, a copolymerizable monomer containing the alkali salt of sulfonic acid, carboxylic acid or phosphoric acid and, if required, the other copolymerizable monomers than the above-given monomers. Because these copolymers are prepared in a vinyl-synthesizing process, they can readily be prepared and the copolymeric components can variously be selected out, so that they can be controlled so as to have the optimum characteristics.

It is desirable that the metals of the salts such as those of sulfonic acid, carboxylic acid or phosphoric acid are to be the alkali metals -including particularly those of sodium, potassium or lithium-. Among them, those of potassium are preferable from the viewpoints of solubility, reactivity and yield.

In the meanwhile, when providing back-coat layer 3, it is prepared by containing non-magnetic particles such as those of barium sulfate into the above-mentioned binder, and the resulting coating solution is coated over the rear surface of a support.

The raw materials of the above-mentioned support 1 include, for example, plastics such as polyethylene terephthalate and polypropylene, metals such as Al and Zn, glass, BN, Si-carbide, and seramics such as porcelain and earthenware.

Figure 3:
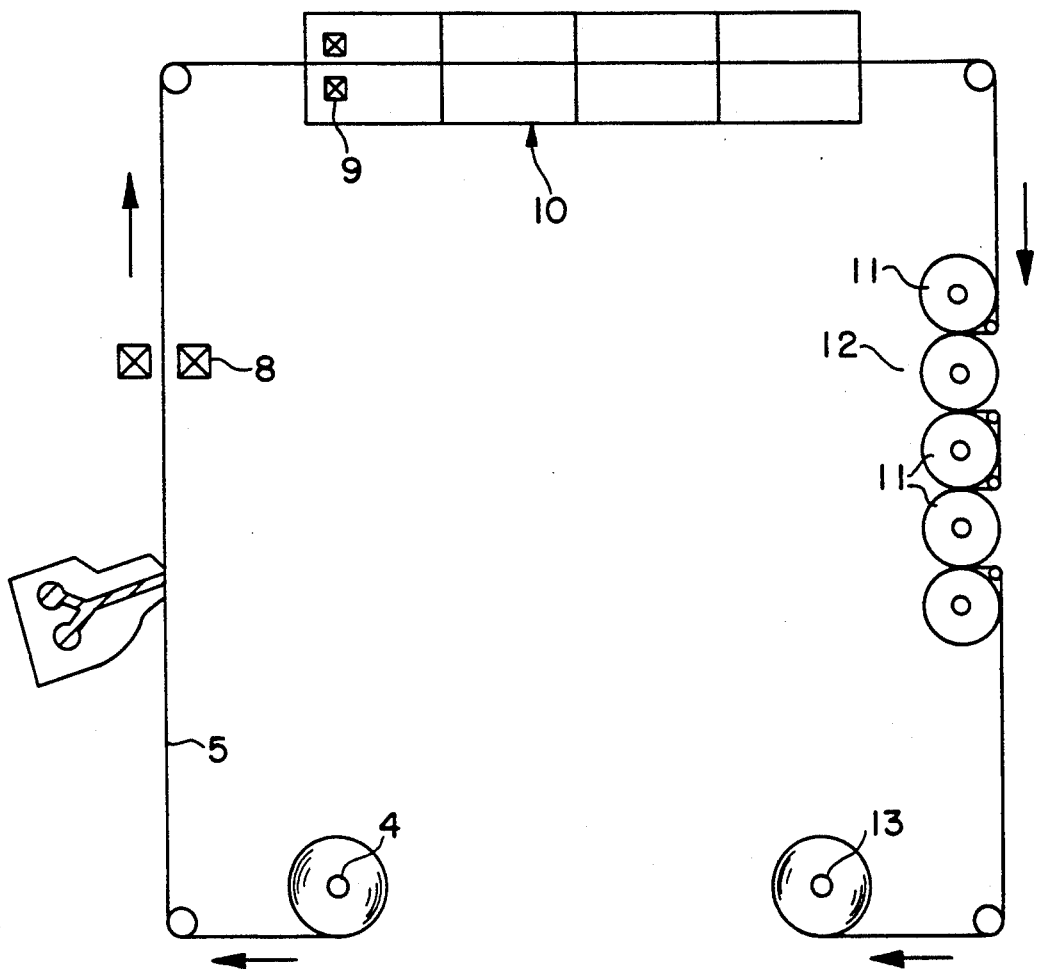
FIG. 3 shows a schematic illustration of an apparatus for preparing magnetic recording media.

An example of the apparatuses for preparing the above-described media is shown in FIG. 3.

When preparing the medium shown in FIG. 1 by making use of the above-mentioned medium preparing apparatus, the following steps are taken. First, film-shaped support 1 let out from supply roller 32 is coated thereon with each of the coating paints for the above-mentioned magnetic layers 2, 4 by extrusion coater 10. Then, the resulting coated support is magnetically aligned by a front aligning magnet 33 having 2000 Gauss for example and is then introduced into drier 34 attached with a rear aligning magnet 35 havinf 2000 Gauss for example. Further, it is dried by blowing hot air from the nozzles arranged respectively to the upper and lower parts of the drier 34. Next, support 1 already coated with each of the magnetic layers and dried is introduced into a supercalender 37 comprising a combination of calender rollers 38 and is then subjected to a calender treatment. The calendered support 1 is then taken up by and round take-up roller 39. Each of the paints may also be supplied to extrusion coaters 10 and 11 through an in-line mixer not shown in the drawing. In the drawing, arrow mark D indicates the direction of transporting a non-magnetic film base. Extrusion coaters 10 and 11 are provided with solution reservoirs 13 and 14, respectively, and the paints extruded out of each of the coaters are multicoated over the calendered support 1 in a wet-on-wet process.

For preparing the medium shown in FIG. 2, it is allowed to provide another additional coater to the preparation apparatus shown in FIG. 3.

EXAMPLES

The following examples of the invention will now be detailed.

It is allowed to change variously the following components, proportions or the ratios, operational orders, and the like, without departing from the spirit of the invention. The term, 'part' or 'parts' expressed herein, means 'a part or parts by weight'.

EXAMPLE 1

First, magnetic paint A for the upper layer use and magnetic paint B for the lower layer use were prepared by mixedly kneading each of the following compositions by making use of a kneader and then by dispersing them by making use of a sand mill.

| <Magnetic paint A for the upper layer use> | |
| --- | --- |
| Ferromagnetic metal powder, Composition: Fe:Al = 100:5, Hc: 1580 Oe, $\sigma_s$: 120 emu/g, BET specific surface area: 56 m$^2$/g, and adsorbate moisture content: 1.0 wt %- | 100 parts |
| Vinyl chloride type resin containing potassium sulfonate, Trade name, MR110, manufactured by Nippon Zeon Co.- | 10 parts |
| Cyclohexanone | 100 parts |
| Toluene | 100 parts |

5 parts each of polyisocyanate (colonate L, manufactured by Nihon Polyurethane Industry Co., Ltd.) were added to the magnetic paint A and B. The magnetic paint B for the lower layer use and the magnetic paint A for the upper layer use were coated in this order over to a 10.0 μm-thick polyethylene terephthalate film base, so as to have the coated thicknesses of 0.5 μm for the upper layer and 2.5 μm for the lower layer, respectively, in a wet-on-wet coating process by making use of the apparatus shown in FIG. 3. Then, after aligning and drying the coated support, a calender treatment was applied.

After that, the paint for BC layer use having the following compositions was coated over to the opposite side of the magnetic layers so as to have a dried thickness of 0.8 μm.

| | |
| --- | --- |
| Carbon black, -Raven 1035- | 40 parts |
| Barium sulfate, having an average particle size of 300 mμ- | 10 parts |
| Nitrocellulose | 25 parts |
| N-2301, manufactured by Nippon Urethane Co.- | 25 parts |
| Polyisocyanate compound (Coronate L, produced by Nippon Polyurethane Industry) | 10 parts |
| Cyclohexanone | 400 parts |
| Methyl ethyl ketone | 250 parts |

| -continued | |
|---|---|
| Toluene | 250 parts |

In the above-mentioned procedures, a wide magnetic film was obtained and was then taken up. The resulting film was cut into every 8 mm wide, so that the 8 mm wide tapes could be prepared.

EXAMPLES 2 and 3

The 8 mm-wide tapes were prepared in the same manner as in Example 1, except that the Co-containing iron oxide—having an Hc: 810 Oe—used for the lower layer of Example 1 was replaced by the Co-containing iron oxide shown in the following Table-1A.

EXAMPLE 4

The 8 mm-wide tapes were prepared in the same manner as in Example 1, except that the magnetic powder for the upper layer of Example 1 was replaced by Fe-Ni magnetic powder—having an adsorbate moisture content of 1.0 wt. %—.

EXAMPLES 5 and 6

The 8 mm-wide tapes were prepared in the same manner as in Example 1, except that the magnetic powder for the upper layer of Example 1 was replaced by Fe-Ni magnetic powder—having an adsorbate moisture content of 1.0 wt. %—and the Co-containing iron oxide for the lower layer of Example 1 was replaced by the Co containing iron oxide shown in the following Table-1A.

EXAMPLES 7, 8 and 9

The 8 mm-wide tapes were prepared in the same manner as in Example 1, except that the magnetic powder for the upper layer of Example 1 was replaced by the magnetic powder shown in the following Table-1A.

EXAMPLES 10 through 15

The 8 mm-wide tapes were prepared in the same manner as in Example 1, except that the magnetic powder used for the upper layer of Example 1 was replaced by the magnetic powder shown in the following Table-1A and the Co-containing iron oxide—having an Hc: 810 Oe—for the lower layer of Example 1 was replaced by the Co-containing iron oxide shown in the following Table-1A.

COMPARATIVE EXAMPLES 1, 2 and 3

The 8 mm-wide tapes were prepared in the same manner as in Example 1, except that the magnetic powder for the upper layer of Example 1 was replaced by the magnetic powder shown in the following Table-1B.

COMPARATIVE EXAMPLES 4, 5 and 6

The 8 mm-wide tapes were prepared in the same manner as in Example 1, except that the Co-containing iron oxide—having an Hc: 810 Oe—used for the lower layer of Example 1 was replaced by the Co containing iron oxide shown in the following Table-1B.

COMPARATIVE EXAMPLES 7 and 8

The 8 mm-wide tapes were prepared in the same manner as in Example 1, except that the magnetic powder for the upper layer of Example 1 was replaced by the magnetic powder shown in the following Table-1B and the Co-containing iron oxide—having an Hc: 810 Oe—used for the lower layer of Example 1 was replaced by the Co-containing iron oxide shown in the following Table-1B.

COMPARATIVE EXAMPLES 9 and 10

The 8 mm-wide tapes were prepared in the same manner as in Example 1, except that the magnetic powder for the upper layer of Example 1 was replaced by Co-containing iron oxides—out of them, one having an adsorbate moisture content of 1.0 wt. % and the other having an adsorbate moisture content of 0.1 wt. %—.

<The method of measuring characteristics in the examples and the comparative examples>

The following performance evaluation of the resulting tapes were tried, and the results thereof are shown in the following Table-1.

RF output and lumi S/N:

A deck, Model V-900 manufactured by Sony Corp. was used. A 100% white signal was input and regenerated on a subject magnetic recording medium, on a standard level. A regenerated video signal was input to a noise meter, Model 921D/1 manufactured by Shiba-Soku Lab., and a lumi S/N was read from the resulting absolute noise value.

Chroma S/N and chroma output:

A deck, Model V-900 manufactured by Sony Corp., was used, and a regeneration was carried out. Further, a noise meter, manufactured by Shiba-Soku Lab., was used, In comparing the resulting tapes to a control tape, the difference in the S/N ratios of the samples between the chroma signals were obtained.

Adsorbate moisture content:

A microconstituent moisture measuring instrument, Model CA-06 manufactured by Mitsubishi Chemical Industrial Co., was used to measure the respective adsorbate moisture contents at a temperature of 120° C. in a Karl Fischer's process.

Running durability:

At a temperature and humidity of 40° C. and 80% RH, the whole length of every tape was ran through 50 passes. After completing the running them, the resulting tape damages were visually judged.

The results of the dudgements were graded as follows:

○: No edge damage was produced;

△: Edge damages were produced in a part of the subject tape; and

X: Edge damages were produced all along the length of the subject tape.

Residual solvent content:

A gaschromatographic instrument, Model HP-5890 manufactured by Yokogawa-Hewlet Packard Inc., was used to measure the resulting residual solvent contents.

First, the residual solvent contents of the whole magnetic layer were measured, and the magnetic layer portion of the uppermost layer was removed by grinding by making use of a diamond wheel. Next, the residual solvent contents of the remaining magnetic layer portions were then measured. Then, the residual solvent content of the uppermost layer was calculated out by deducting the residual solvent contents of the remaining magnetic layer portions from the whole residual solvent contents. The resulting residual solvent content of the uppermost layer are expressed in terms of a coated thickness of 3.0 $\mu$.

TABLE-1A

| Example No. | 1 | 2 | 3 | 4 | 5 | 6 | 7 | 8 | 9 | 10 |
|---|---|---|---|---|---|---|---|---|---|---|
| The uppermost magnetic layer | | | | | | | | | | |
| Component | Fe—Al | Fe—Al | Fe—Al | Fe—Ni | Fe—Ni | Fe—Ni | Fe—Al | Fe—Al | Fe—Al | Fe—Al |
| Adsorbate moisture content (wt %) | 1.0 | 1.0 | 1.0 | 1.0 | 1.0 | 1.0 | 0.5 | 0.2 | 1.5 | 0.8 |
| The lower layer | | | | | | | | | | |
| magnetic powder component | Co-containing iron oxide | " | " | " | " | " | " | Co-containing iron oxide | " | " |
| The lower layer coercive force (Oe) | 905 | 650 | 1150 | 905 | 650 | 1150 | 904 | 901 | 906 | 907 |
| Magnetic powder coercive force of the lower layer (Oe) | 810 | 600 | 1070 | 810 | 600 | 1070 | 810 | 810 | 810 | 810 |
| RF output (dB) | 1.7 | 1.6 | 1.8 | 1.9 | 1.8 | 1.9 | 1.8 | 1.9 | 1.5 | 1.7 |
| Lumi S/N (dB) | 1.1 | 1.0 | 1.2 | 1.3 | 1.2 | 1.4 | 1.1 | 1.2 | 0.9 | 1.0 |
| Chroma output (dB) | 3.0 | 3.6 | 2.5 | 3.1 | 1.2 | 1.4 | 1.1 | 3.2 | 2.8 | 2.9 |
| Chroma S/N (dB) | 0.7 | 0.5 | 0.6 | 0.8 | 0.7 | 0.9 | 0.8 | 0.8 | 0.6 | 0.7 |
| Running propert | ○ | ○ | ○ | ○ | ○ | ○ | ○ | ○ | ○ | ○ |
| Residual solvent content of the uppermost layer ($\mu l/m^2$) | 2.1 | 1.9 | 2.2 | 2.2 | 2.1 | 2.2 | 2.1 | 2.9 | 2.0 | 2.1 |

| Example No. | 11 | 12 | 13 | 14 | 15 |
|---|---|---|---|---|---|
| The uppermost magnetic layer | | | | | |
| Component | Fe—Al | Fe—Al | Fe—Al | Fe—Al | Fe—Al |
| Adsorbate moisture content (wt %) | 1.2 | 1.0 | 1.0 | 1.0 | 1.0 |
| The lower layer | | | | | |
| magnetic powder component | " | " | " | " | " |
| The lower layer coercive force (Oe) | 906 | 500 | 702 | 1007 | 1200 |
| Magnetic powder coercive force of the lower layer (Oe) | 810 | 450 | 630 | 915 | 1140 |
| RF output (dB) | 1.6 | 1.3 | 1.5 | 1.8 | 1.9 |
| Lumi S/N (dB) | 1.1 | 0.9 | 1.0 | 1.2 | 1.5 |
| Chroma output (dB) | 3.0 | 3.4 | 3.2 | 2.8 | 2.1 |
| Chroma S/N (dB) | 0.7 | 0.6 | 0.7 | 0.8 | 0.7 |
| Running propert | ○ | ○ | ○ | ○ | ○ |
| Residual solvent content of the uppermost layer ($\mu l/m^2$) | 2.0 | 2.1 | 2.1 | 2.1 | 2.1 |

TABLE-1B

| Comparative example No. | 1 | 2 | 3 | 4 | 5 | 6 | 7 | 8 | 9 | 10 |
|---|---|---|---|---|---|---|---|---|---|---|
| The uppermost magnetic layer | | | | | | | | | | |
| Component | Fe—Al | Fe—Al | Fe—Al | Fe—Al | Fe—Al | Fe—Al | Fe—Al | Fe—Al | Co-containing iron oxide | Co-containing iron oxide |
| Adsorbate moisture content (wt %) | 0.1 | 0 | 1.6 | 1.0 | 1.0 | 1.0 | 0.1 | 1.6 | 1.0 | 0.1 |
| The lower layer | | | | | | | | | | |
| magnetic powder component | Co-containing iron oxide | " | " | " | " | Fe—Al | Co-containing iron oxide | " | Co-containing iron oxide | " |
| The lower layer coercive force (Oe) | 901 | 895 | 903 | 450 | 1310 | 1550 | 450 | 1301 | 902 | 904 |
| Magnetic powder coercive force of the lower layer (Oe) | 810 | 810 | 810 | 403 | 1250 | 1540 | 403 | 1240 | 810 | 810 |
| RF output (dB) | 1.9 | 1.9 | 1.1 | 1.1 | 1.8 | 1.8 | 1.1 | 1.2 | −1.5 | −1.8 |
| Lumi S/N (dB) | 1.2 | 0.9 | 1.0 | 1.1 | 0.9 | 1.0 | 1.2 | 1.5 | −2.0 | −2.1 |
| Chroma output (dB) | 3.2 | 3.1 | 2.4 | 3.6 | 1.6 | 0.2 | 3.5 | 1.3 | 2.9 | 2.8 |
| Chroma S/N (dB) | 0.9 | 0.8 | 0.4 | 0.5 | 0.8 | 0.9 | 0.4 | 0.3 | 0.1 | −0.1 |
| Running property | Δ | X | ○ | ○ | ○ | ○ | Δ | ○ | ○ | ○ |
| Residual solvent content of the upper- | 4.2 | 6.1 | 2.0 | 2.0 | 2.1 | 2.0 | 4.3 | 2.0 | 2.1 | 2.6 |

TABLE-1B-continued

| Comparative example No. | 1 | 2 | 3 | 4 | 5 | 6 | 7 | 8 | 9 | 10 |
|---|---|---|---|---|---|---|---|---|---|---|
| most layer (μl/m²) | | | | | | | | | | |

From the results thereof, it can be found in accordance with the invention that, when the magnetic layer of the uppermost layer contains ferromagnetic metal powder having an adsorbate moisture content in a weight percentage within the range of 0.2 to 1.5 wt. %, the kneading property can be excellent, the residual solvent content can remarkably be reduced, the running durability can greatly be improved, and the RF output and lumi S/N can each be excellent. In addition to the above, it can be found that, when the magnetic coercive force of the lower layer is kept to be within the range of 500 to 1200 Oe, the electromagnetic conversion characteristics including, particularly, the chroma output, can be improved, and the RF output, lumi S/N and chroma S/N can also be excellent. Besides the above, when making use of iron oxide magnetic powder in the uppermost layer, it is obvious that the characteristics cannot be affected so much by the adsorbate moisture contents—See Comparative Examples 9 and 10—; and, when magnetic metal powder is used in the uppermost layer, the superiority of the invention—i.e., the superiority to others in the influences of the adsorbate moisture contents—can be remarkable to others.

Next, the performance evaluations were tried in the same manner as in the aforementioned evaluations when a magnetic layer is comprised of three layers, namely, layers 2, 5 and 6 as shown in FIG. 2, -provided, however, that the upper layer 6 and the lower layer 2 have each the same compositions as afore-given and the intermediate layer 5 has the same compositions as in lower layer 2, except that the Hc of intermediate layer 5 is of the middle between those of the upper and lower layers, and that the coated thicknesses of the upper layer, the intermediate layer and the lower layer are 0.3 μm, 0.3 μm, and 2.5 μm, respectively—. The results thereof were obtained as shown in the following Table-2. According to the results thereof, it can be proved that the performance can fully be displayed as same as in the case of the foregoing two-layer structure, when the invention is constituted.

| Inventive example No. | 16 | 17 |
|---|---|---|
| Magnetic powder of the uppermost layer | | |
| Component | Fe—Al | Fe—Al |
| Adsorbate moisture content (wt %) | 0.2 | 1.5 |
| Magnetic powder of the interlayer | | |
| component | Co-containing iron oxide | " |
| The lower layer coercive force (Oe) | 905 | 906 |
| Magnetic powder of the lower layer | | |
| component | Co-containing iron oxide | " |
| The lower layer coercive force (Oe) | 810 | 812 |
| RF output (dB) | 1.7 | 1.6 |
| Lumi S/N (dB) | 1.2 | 1.1 |
| Chroma output (dB) | 3.0 | 2.8 |

-continued

| Inventive example No. | 16 | 17 |
|---|---|---|
| Chroma S/N (dB) | 0.7 | 0.6 |
| Running property | o | o |
| Residual solvent content of the uppermost layer (μl/m²) | 2.9 | 2.0 |

In the invention, as described above, the magnetic layer arranged onto a non-magnetic support is comprised of at least two layers, and the uppermost layer of the above-mentioned magnetic layers contains ferromagnetic metal powder having an adsorbate moisture content in a weight percentage within the range of 0.2 to 1.5 wt. %. Therefore, the running durability can be improved by the reduction of a residual solvent content and, further, the electromagnetic conversion characteristics can also be improved by obtaining an excellent kneading property. Also, at least one magnetic layer other than the uppermost layer has a magnetic coercive force within the range of 500 to 1200 Oe. Therefore, the electromagnetic conversion characteristics including, particularly, a chroma output can be improved. Further, the above-mentioned magnetic layer is comprised of at least two layers. Therefore, a substantially wide frequency region can be covered and, in particular, the RF output and lumi S/N can also be made excellent by containing ferromagnetic metal powder into the uppermost layer of the magnetic layers.

What is claimed is:

1. An 8 mm video magnetic recording medium comprising a non-magnetic support having thereon a plurality of magnetic layers coated by a wet-on-wet coating process, said magnetic layers including;

an uppermost layer containing a magnetic metal powder and a polyurethane binder containing a polar group selected from the group consisting of —SO$_3$M, —COOM, and —PO(OM')$_2$, wherein M is hydrogen or an alkali metal and M' is an alkali metal or a hydrocarbon residual group, a water content of said uppermost layer being 0.2 to 1.5 wt. % based on said magnetic powder, said magnetic powder having a BET value of 56 to 80 m$^2$/g, a thickness of said uppermost layer being less than 1.5 μm, and a layer other than said uppermost layer containing a cobalt-containing magnetic iron oxide particle, and a binder having a polar group selected from the group consisting of a sulfonic radical, —COOM, and —PO(OM')$_2$, wherein M represents hydrogen or an alkali metal and M' represents an alkali metal or a hydrocarbon residual group, a coercive force of said layer other than said uppermost layer being 500 to 1200 Oe, and a thickness of said layer other than said uppermost layer being 1.5 to 4.0 μm, said layer other than said uppermost layer being positioned adjacent to said uppermost layer.

2. The medium of claim 1, wherein said coercive force is 800 to 1000 Oe.

3. A magnetic recording medium comprising a nonmagnetic support having thereon a plurality of magnetic layers coated by a wet-on-wet coating process, said magnetic layers including an uppermost layer containing a magnetic metal powder and a polyurethane binder containing a polar group selected from the group consisting of —$SO_3M$, —COOM, and —$PO(OM')_2$ wherein M is a hydrogen or an alkali metal and M' is an alkali metal or a hydrocarbon residual group, the water content of said uppermost layer being 0.2 to 1.5 weight percent based on said magnetic metal powder; and a layer other than said uppermost layer containing a cobalt containing magnetic iron oxide powder, and a binder containing a polar group selected from the group consisting of —$SO_3M$, —COOM, and —$PO(OM')_2$ wherein M is a hydrogen or an alkali metal and M' is an alkali metal or a hydrocarbon residual group, the coercive force of said layer other than said uppermost layer being 500 to 1200 Oe.

4. The medium of claim 3, wherein the water content is 0.8 to 1.2.

5. The medium of claim 3, wherein said coercive force is 700 to 1000 Oe.

6. The medium of claim 3, wherein the layer other than the top layer is next to the top layer.

7. The medium of claim 3, wherein the coercive force of the top layer is 1300 to 2500 Oe.

8. The medium of claim 7, wherein said coercive force of the top layer is 1500 to 2000 Oe.

9. The medium of claim 4, wherein the water content is 0.9 to 1.1.

10. The medium of claim 5, wherein said coercive force is 800 to 1000 Oe.

* * * * *